United States Patent [19]
Haley

[11] Patent Number: 5,884,036
[45] Date of Patent: Mar. 16, 1999

[54] METHOD FOR DETERMINING THE TOPOLOGY OF AN ATM NETWORK HAVING DECREASED LOOPING OF TOPOLOGY INFORMATION CELLS

[76] Inventor: Andrew Paul Haley, 7 Kensington Court Quainton Close, Cambridge, United Kingdom, CB5 8LS

[21] Appl. No.: 747,117

[22] Filed: Nov. 8, 1996

[51] Int. Cl.$^6$ ................................................ G06F 13/00
[52] U.S. Cl. ............................ 395/200.54; 395/200.72
[58] Field of Search .................................. 370/254, 255, 370/401; 395/200.54, 200.72

[56] References Cited

U.S. PATENT DOCUMENTS

| | | | |
|---|---|---|---|
| 4,545,013 | 10/1985 | Lyon et al. .............................. | 364/200 |
| 4,637,013 | 1/1987 | Nakamura ................................ | 370/85 |
| 4,644,532 | 2/1987 | George et al. .......................... | 370/94 |
| 4,827,411 | 5/1989 | Arrowood et al. ...................... | 364/300 |
| 5,007,052 | 4/1991 | Flammer ................................. | 370/85.6 |
| 5,008,879 | 4/1991 | Fischer et al. .......................... | 370/85.2 |
| 5,048,014 | 9/1991 | Fischer .................................... | 370/85.5 |
| 5,049,873 | 9/1991 | Robins et al. ...................... | 340/825.06 |
| 5,051,987 | 9/1991 | Conlon ................................... | 370/94.1 |
| 5,077,732 | 12/1991 | Fischer et al. .......................... | 370/85.4 |
| 5,088,032 | 2/1992 | Bosack ................................ | 395/200.72 |
| 5,101,348 | 3/1992 | Arrowood et al. ...................... | 395/200 |
| 5,142,531 | 8/1992 | Kirby ..................................... | 370/99.3 |
| 5,233,604 | 8/1993 | Ahmadi et al. ........................... | 370/60 |
| 5,235,599 | 8/1993 | Nishimura et al. ..................... | 371/11.2 |
| 5,265,092 | 11/1993 | Soloway et al. .......................... | 370/60 |
| 5,276,681 | 1/1994 | Tobagi et al. .......................... | 370/85.4 |
| 5,331,635 | 7/1994 | Ota ........................................ | 370/85.13 |
| 5,345,558 | 9/1994 | Opher et al. ............................ | 395/200 |
| 5,390,170 | 2/1995 | Sawant et al. .......................... | 370/58.1 |
| 5,430,729 | 7/1995 | Rahnema ............................... | 370/94.1 |
| 5,506,838 | 4/1996 | Flanagan .................................. | 370/54 |
| 5,517,620 | 5/1996 | Hashimoto et al. ................. | 395/200.72 |
| 5,568,605 | 10/1996 | Clouson et al. ...................... | 395/182.2 |
| 5,682,479 | 10/1997 | Newhall et al. ..................... | 395/200.72 |
| 5,684,796 | 11/1997 | Abidi et al. ........................... | 370/389 |
| 5,715,396 | 2/1998 | Chatwani et al. .................. | 395/200.72 |
| 5,721,819 | 2/1998 | Galles et al. ........................ | 395/200.15 |
| 5,732,072 | 3/1998 | Thanner et al. ......................... | 370/255 |
| 5,742,795 | 4/1998 | Kussel ..................................... | 395/500 |

OTHER PUBLICATIONS

S. Carson & A. Ephremides, "A Distributed Routing Algorithm For Mobile Radio Networks," *Conference Record of the 1989 IEEE Military Communications Conference*, Oct. 15–18, 1989, vol. 1, pp. 210–213.

V. Catania et al., "A Routing Strategy For MAN Interconnection," *Proceedings of IEEE INFOCOM '91*, Apr. 7–11, 1991, vol. 2, pp. 608–615.

*Primary Examiner*—Lance Leonard Barry, Esq.
*Attorney, Agent, or Firm*—Pennie & Edmonds LLP

[57] ABSTRACT

The present invention describes a technique for determining the topology of a network where each node of the network may issue a topology information request cell. Each switch that receives a topology information request cell compares it with a stored cells in an internal look-up table to determine if it has previously received a same cell via a shorter route. If the cell has been previously received via a shorter route, the present cell is discarded, if not, the look-up table is updated. Non-discarded cells are retransmitted on all output ports except the output port corresponding to the input port on which the cell was received. The switch also responds to the topology information request cell by transmitting a topology acknowledgement cell back to the node which initiated the topology information request. In such a manner, every switch in the network can determine the topology of the entire network.

14 Claims, 5 Drawing Sheets

METHOD FOR DETERMINING THE TOPOLOGY OF AN ATM NETWORK HAVING DECREASED LOOPING OF TOPOLOGY INFORMATION CELLS

TECHNICAL FIELD

The present invention relates generally to the field of data communication networks. More specifically, the present invention relates to a method for determining the topology of an asynchronous transfer mode network.

BACKGROUND OF THE INVENTION

The advent of the multimedia PC has been one of the key developments in the computer industry in the 1990s. Originally the term multimedia PC was loosely defined to refer to a personal computer with a CD-ROM and audio capabilities. Recently, however, new applications such as video conferencing, video-on-demand, interactive TV, and virtual reality have been proposed. Rather than the mere integration of text, audio and video, the nature of these applications requires the transfer of high volumes of data between multiple users. As a result, it is now widely recognized that for multimedia to reach its full potential it must become a network based technology rather than a limited local resource.

Unfortunately, the real-time nature of multimedia video and audio streams renders existing local area networks ("LANs") unsuitable for these applications. Conventional LAN designs, most of which are based upon shared media architectures such as Ethernet and Token Ring, have no capability to guarantee the bandwidth and quality of service necessary to accommodate multimedia services. As such, these networks cannot efficiently handle high-speed, real-time video and audio data without introducing significant distortions such as delay, echo and lip synchronization problems.

Recently, as the need for an alternative networking technology to accommodate multimedia in the LAN setting has become apparent, researchers have explored the technologies proposed for the Broadband Integrated Digital Services Network ("B-ISDN"). As high bandwidth requirements and bursty data transmission are commonplace in this wide area network, solutions used in B-ISDN may be applicable to the multimedia LAN environment.

Specifically, the B-ISDN standards, promulgated by the International Telegraph and Telephone Consultative Committee ("CCITT"), now reorganized as the Telecommunications Standardization Sector of the International Telecommunication Union ("ITU-T"), define a packet multiplexing and switching technique, referred to as Asynchronous Transfer Mode ("ATM"). This technique is well known in the art and is described in various references. E.g., Martin de Prycker, *Asynchronous Transfer Mode: Solution for Broadband ISDN* (2nd Ed., Ellis Horwood Ltd, West Sussex, England, 1993).

In ATM, information is carried in packets of fixed size, specified for B-ISDN as 53 bytes (octets), called cells. Cells are statistically multiplexed into a single transmission facility which may carry hundreds of thousands of ATM cells per second originating from a multiplicity of sources and travelling to a multiplicity of destinations.

ATM is a connection-oriented technology. Rather than broadcasting cells onto a shared wire or fiber for all network members to receive, a specific routing path through the network, called a virtual circuit, is set up between two end nodes before any data is transmitted. Cells identified with a particular virtual circuit are only delivered to nodes on that virtual circuit and are guaranteed to arrive in the transmitted order at the destination of the virtual circuit. ATM also defines virtual paths, bundles of virtual circuits traveling together through at least a portion of the network, the use of which can simplify network management.

The internal nodes of an ATM network comprise switching devices capable of handling the high-speed ATM cell streams. These devices perform the functions required to implement a virtual circuit by receiving ATM cells from an input port, analyzing the information in the header of the incoming cells in real-time, and routing them to the appropriate destination port.

To achieve the most efficient network performance, virtual circuits selected at connection set-up time typically should form the shortest path from source to destination through the internal nodes of the network. Of course, to accurately select this path, the topology or layout of the network must be known.

A popular prior art technique for determination of network topology utilizes a process of flooding the network with topology information cells. See, e.g., U.S. Pat. No. 5,390,170, entitled "Method and Apparatus Providing for Bootstrapping of Switches in an ATM Network or the Like" issued to Sawant et al., on Feb. 14, 1995. In systems employing this technique, each switch transmits link state information cells upon each of its outputs. In turn, every switch which receives an input link state information cell retransmits the cell upon its own output links. In such a manner, topology information from all other internal nodes of the network is collected at each internal node. The entire network configuration can be determined at each internal node by analyzing this collected information.

It is readily apparent, however, that physical loops within the ATM network will create undesirable infinite looping of topology information cells within the network. In FIG. 1, for example, which illustrates a simple ATM network, if switch 120-1 issues a topology information cell, the cell would be sent to switches 120-2 and 120-3. Switches 120-2 and 120-3 would then forward the cell upon their outputs, thus sending topology information cells to switches 120-3 and 120-4, and 120-2 and 120-4, respectively. Upon receipt of these new cells, each of these switches 120-2, 120-3 and 120-4 will again forward the cell upon their respective outputs. In this manner, infinite looping of topology information cells occurs.

Of course, infinite looping may be eliminated by requiring that no physical loops exist within the ATM network. Such a solution is practical in a wide area network where the actual end-node devices connected to the network are unknown. However, physical loops are often highly desirable in ATM LANs. Efficiencies may be achieved by connecting devices requiring repeated, high-performance inter-communications within a small physical loop in the network. For example, many multi-media applications require repetitive communication between specific devices. Performance can be enhanced by confining this communication to a short path between such devices, while still providing access to other devices on the network.

Systems have been disclosed which eliminate the possibility of infinite looping of topology information cells despite the presence of physical loops within the network. See, e.g., U.S. Pat. No. 5,345,558 entitled "Topology Independent Broadcast of Cells in an ATM Network or the Like" issued to Opher et al., on Sep. 6, 1994. In these systems, the topology information cells maintain a record of the number of internal nodes they have visited. After this number reaches a certain predetermined limit, the cell is assumed to be looping and is discarded. However, for any sizable network, the predetermined limit must be sufficiently large to avoid discarding non-looping cells. As a result, although cells will not loop infinitely, they may be permitted to loop for a considerable time. These looping cells will still increase network traffic and degrade overall network performance.

Therefore, a need persists for a method for determining the topology of an ATM network which can reliably operate in a network containing physical loops, but yet avoids the undesirable looping of topology information cells.

SUMMARY OF THE INVENTION

The present invention is directed to a method for determining the topology of a network wherein a first node transmits a topology request packet upon one or more of its output ports. This topology request packet is received by at least one other network node. Each node which receives the topology request packet compares the request packet with previously received request packets stored in a look-up table. Specifically, the table information is used to determine whether the particular topology request packet has been received by the node before. If the request packet has been received before, the node discards the topology request packet, otherwise it retransmits the topology request packet on all output ports except the output port corresponding to the input port on which the packet was received. In either case, the node returns an topology acknowledgement packet back to the original sending node containing information from which the network topology can be determined.

BRIEF DESCRIPTION OF THE DRAWINGS

A more complete understanding of the invention may be obtained by reading the following description in conjunction with the appended drawings in which like elements are labeled similarly and in which.

DETAILED DESCRIPTION OF THE INVENTION

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Furthermore, although what is described herein is a method for use in ATM networks, it should be understood that the present invention is in no way limited in applicability to ATM networks as defined by the CCITT. Rather, one skilled in the art will recognize that the principles described herein may be employed in a wide variety of packet switching networks. For examples of some alternative networks see de Prycker, pp. 50–58.

Figure 2A:
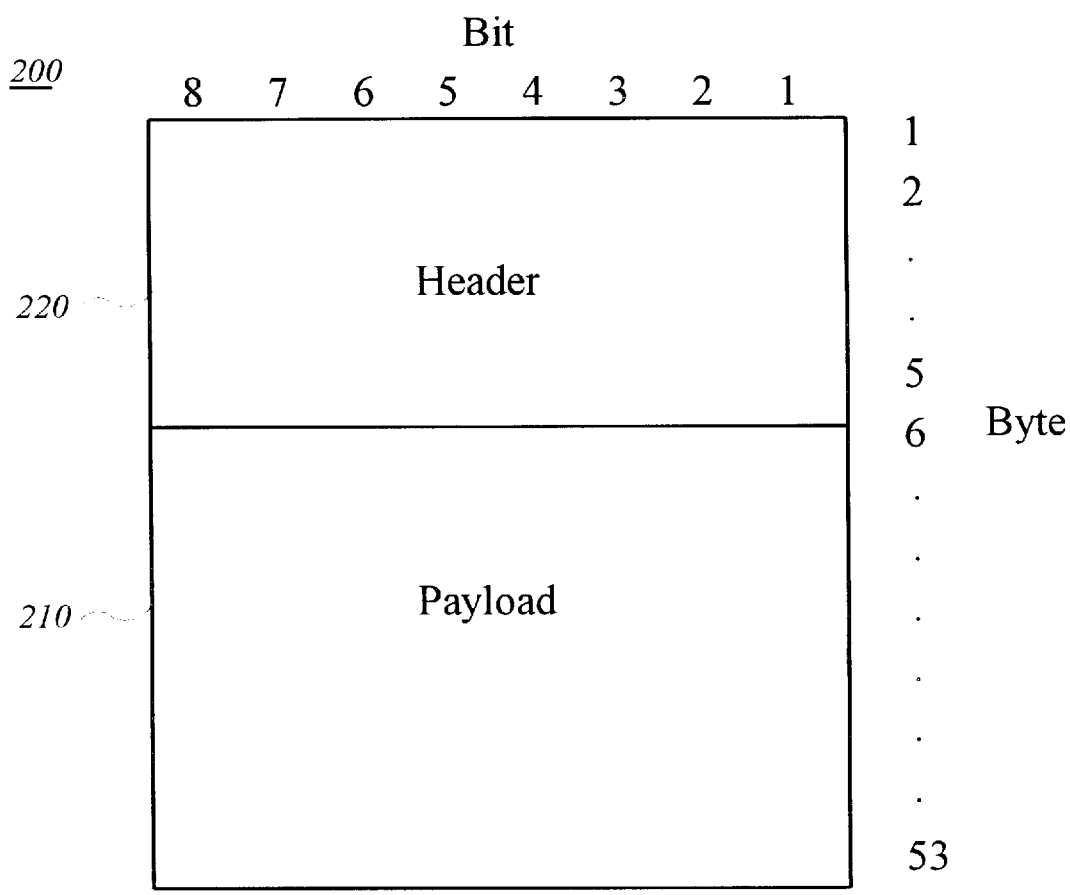
FIG. 2A is a diagram of an ATM cell as defined by the CCITT.

The preferred embodiment of the present invention transmits topology information between network nodes in the form of standard ATM cells. As such, a description of a standard ATM cell configuration would aid in the understanding of the following description. FIG. 2A illustrates a typical ATM cell, comprising a header portion 220 and a payload portion 210. The payload portion 210 contains the information which forms the object of the transmission, such as audio, video, data or topology information. In contrast, cell header 220, or simply "header", is used for transmitting a variety of control information regarding the instant cell.

Figure 2B:
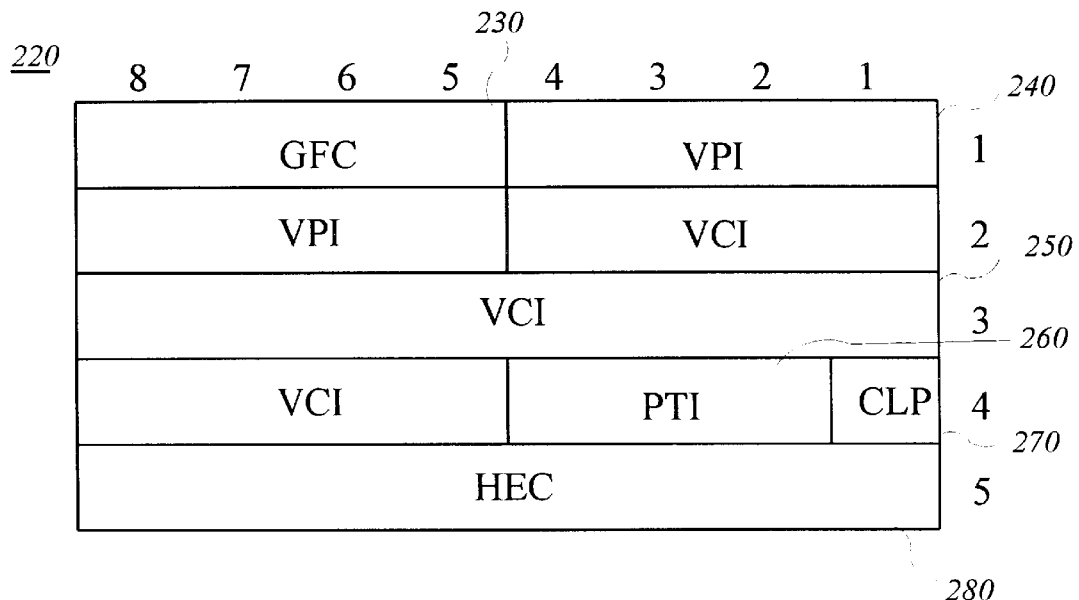
FIG. 2B is a diagram of an ATM cell header at the User-Network Interface as defined by CCITT.

FIG. 2B shows the structure of header 220 at the User-Network Interface ("UNI"), that is, the interface between an end-user device and an ATM switch. Here, the header is made up of a Generic Flow Control ("GFC") field 230 for specifying information which may be used to control traffic flow at the user-network interface, a virtual path identifier ("VPI") 240, a virtual circuit identifier ("VCI") 250, a Payload Type Identifier ("PTI") field 260 which provides information regarding the type of information contained in payload 210 of the cell, Cell Loss Priority ("CLP") flag 270 for setting the priorities relating to the abandonment of the cell during overload conditions, and a Header Error Control ("HEC") field 280 which contains an error control checksum for the previous four bytes in header 220.

Figure 2C:
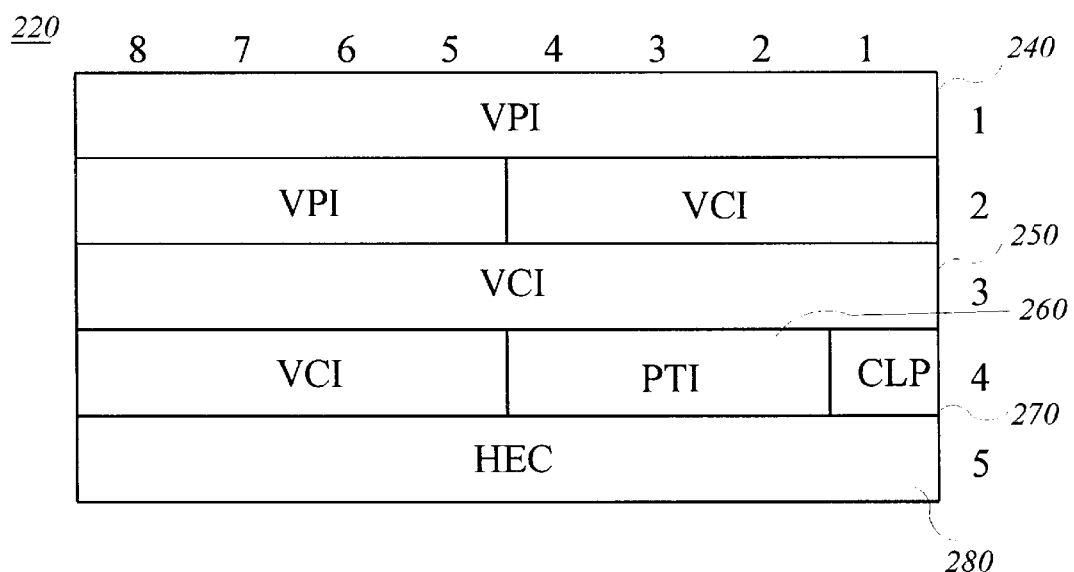
FIG. 2C is a diagram of an ATM cell header at the Network-Network Interface as defined by CCITT.

FIG. 2C shows the format of header 220 at the Network-to-Network Interface ("NNI"), the interface between network switches. This header structure is identical to the structure at the UNI except GFC 230 is replaced with four additional bits of VPI 240. ATM networks do not provide for flow control of the type which is implemented in some packet networks and ATM networks have no facility to store cells over a long period of time. Therefore, inside an ATM network there is no need for generic flow control. Thus, GFC 230 may be eliminated in favor of an expanded VPI 240. However, if eight bits of VPI are sufficient, the header 220 of FIG. 2B may be used throughout the network. For more information regarding standard ATM cell formats see de Prycker, pp. 124–28. Of course, those skilled in the art will recognize that alternative fixed cell sizes and header formats other than those shown in FIGS. 2B–2C may be utilized. See Dimitri Bertsekas & Robert Gallager, *Data Networks* (2nd ed., Prentice Hall, Englewood Cliffs, N.J., 1992), pp. 37–141, for examples of a variety of header structures suitable for use in a wide range of network technologies. Furthermore, when alternative packet networks are implemented, it will be understood that a cell may be a packet or any other way to provide a collection of data on a network.

Figure 1:
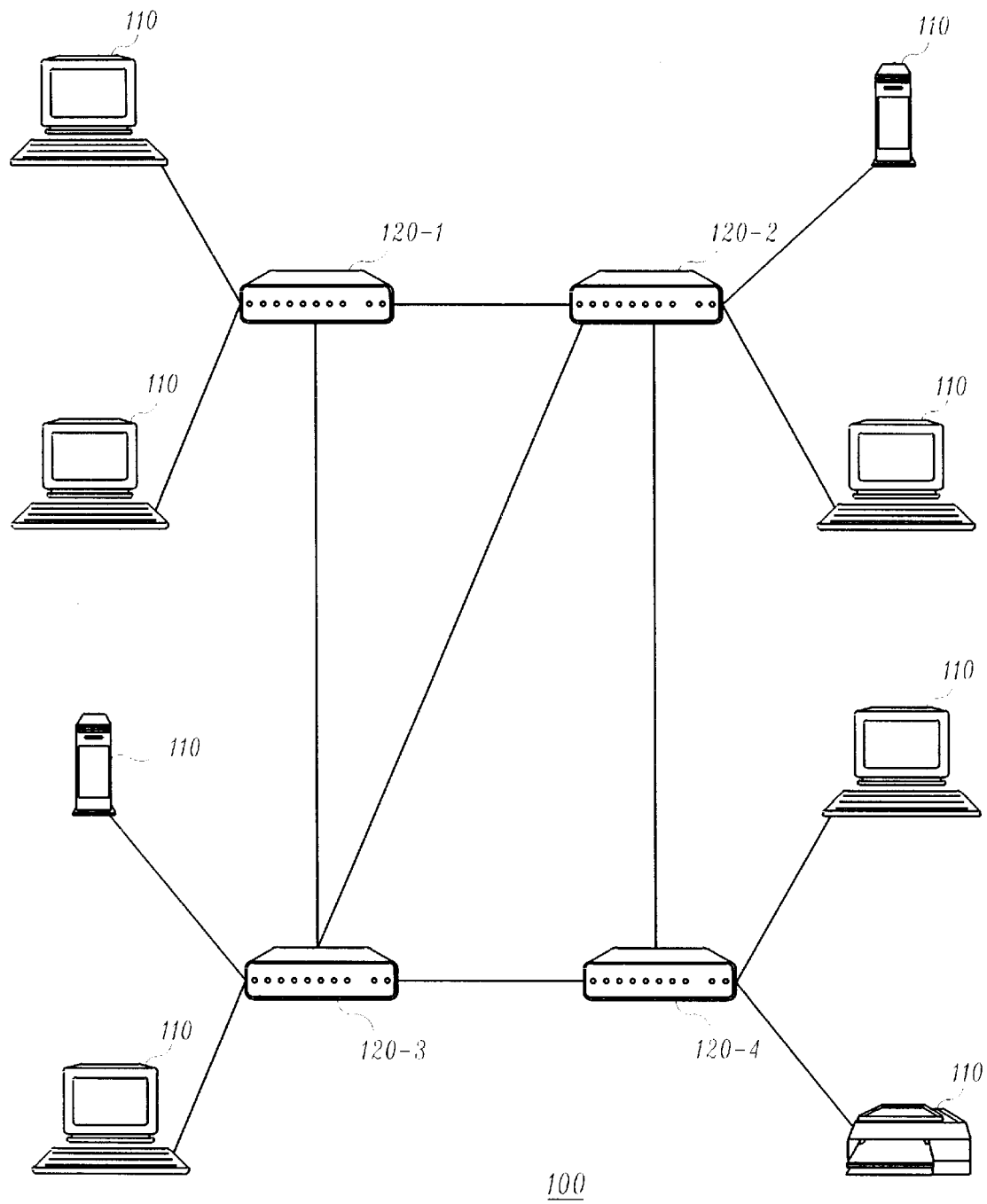
FIG. 1 is an illustrative diagram of an ATM local area network.

As mentioned above, an illustration of an ATM network 100 is shown in FIG. 1. To determine the topology of the network, each node 120 comprising the network periodically emits a special signalling cell on each of its outputs. This signalling cell is a single ATM cell sent on a pre-assigned virtual circuit. By pre-assigning the virtual circuit, low-level interactions in the network are greatly simplified. Limiting the signalling cell to a single cell also eliminates any concerns about interleaving messages. However, despite being limited to a single cell, the signalling cells may form legal ATM Adaption Layer 5 ("AAL5") packets. As is well known in the art, such packets provide CRC error protection of the packet contents.

Each of these signalling cells may comprise eight pieces of information in its payload portion 220. This information is briefly summarized below in Table 1, and in greater detail thereafter. Furthermore, although not shown in Table 1, the AAL5 CRC may form the last 8 bytes of the signalling cell.

TABLE 1

| ITEM | NAME | DESCRIPTION |
| --- | --- | --- |
| 1 | hop_count | hop count for this cell |
| 2 | type | packet type |
| 3 | senders_address | address of the node making the topology request |
| 4 | identifier | unique identifier of the topology request |
| 5 | node_address | address of the replying node |
| 6 | node_port | physical port upon which the topology request arrived |
| 7 | switch_address | address of the switch connected to the replying node |
| 8 | switch_port | physical port of the switch connected to the replying node |

These signalling cells form two different categories of messages, topology requests and topology acknowledgements. The type of a particular signalling cell can be identified by inspecting the TYPE field which will be set to a value representing either a TOPOLOGY_REQUEST cell or a TOPOLOGY_ACKNOWLEDGE cell.

All nodes in the network can independently determine the topology of the network by emitting a TOPOLOGY_REQUEST cell. Typically, all network nodes will periodically generate this message. For the sake of clarity, the following discussion will describe the network response to a single TOPOLOGY_REQUEST message from a single node, hereinafter called the initiator node. It will be recognized that all nodes desiring topology information will continually act as initiator nodes.

The TOPOLOGY_REQUEST message is issued in a "broadcast" mode. A node receiving a signalling cell sent in broadcast mode will thereafter reissue the cell upon all output ports of the node except for the output port corresponding to the input port on which the cell was received. In other words, once the initiator node starts a topology determination sequence by emitting a TOPOLOGY_REQUEST cell upon all of its output ports, each neighbor or receiving node will forward this message upon all of its output ports, except the output port corresponding to the sending node. In this manner the TOPOLOGY_REQUEST cell is propagated throughout the entire network.

When the initiator node constructs and emits the TOPOLOGY_REQUEST message, it sets the HOP_COUNT field to a predetermined value. In the preferred embodiment, the predetermined value is zero. Every succeeding switch to receive this message increments the value of the HOP_COUNT field by one. In such a manner, each switch to receive the cell may determine from the received value of HOP_COUNT how many other nodes the packet has visited before arriving at the present switch. Alternatively, the initial value of the HOP_COUNT field may be a predetermined value other than zero and thereafter decremented by one after each transmission.

In the preferred embodiment of the present invention, each TOPOLOGY_REQUEST message includes an IDENTIFIER field containing an identifier uniquely identifying each request sequence. No two topology request cells emitted by a single initiator node are permitted to contain the same identifier. While individual cells associated with the same request sequence will have the same identifier, cells from different request sequences will have different identifiers. This IDENTIFIER field ensures that nodes can distinguish between request cells that are looping and new requests. Furthermore, as described below, every new topology request generates a response from receiving nodes. The unique identification in the IDENTIFIER field may be used to correlate responses to the TOPOLOGY_REQUESTs which produced them.

In addition to broadcasting the request upon its output ports, each network node upon receipt of a TOPOLOGY_REQUEST message will respond by emitting a single TOPOLOGY_ACKNOWLEDGE cell on the output port corresponding to the input port on which the request was received. As shown in Table 1, the TOPOLOGY_ACKNOWLEDGE message contains the address of the device responding to the TOPOLOGY_REQUEST message. In this manner, the initiator node will receive a TOPOLOGY_ACKNOWLEDGE message from every device attached to or comprising the network and will thereby be able to reconstruct the topology of the network.

To eliminate infinite looping of TOPOLOGY_REQUEST cells, every switch in the network maintains a look-up table comprising information related to each TOPOLOGY_REQUEST cell received by that switch. In the preferred embodiment, the look-up table stores a complete copy of each previous TOPOLOGY_REQUEST cell from each network sender. At a minimum, each switch records the SENDERS_ADDRESS, NODE_PORT and HOP_COUNT of these cells. The look-up table is preferably indexed via a hashing function. The use of a hash index reduces the required size of the table, thereby eliminating the need for large memory capacity in the switch for storing the table. Hashing also reduces the time for searching information in the table. See, e.g., Alfred V. Aho, et al., *The Design and Analysis of Computer Algorithms*, pp. 111–14 (Addison-Wesley Publishing Company, Reading, Mass., 1974).

Figure 3:
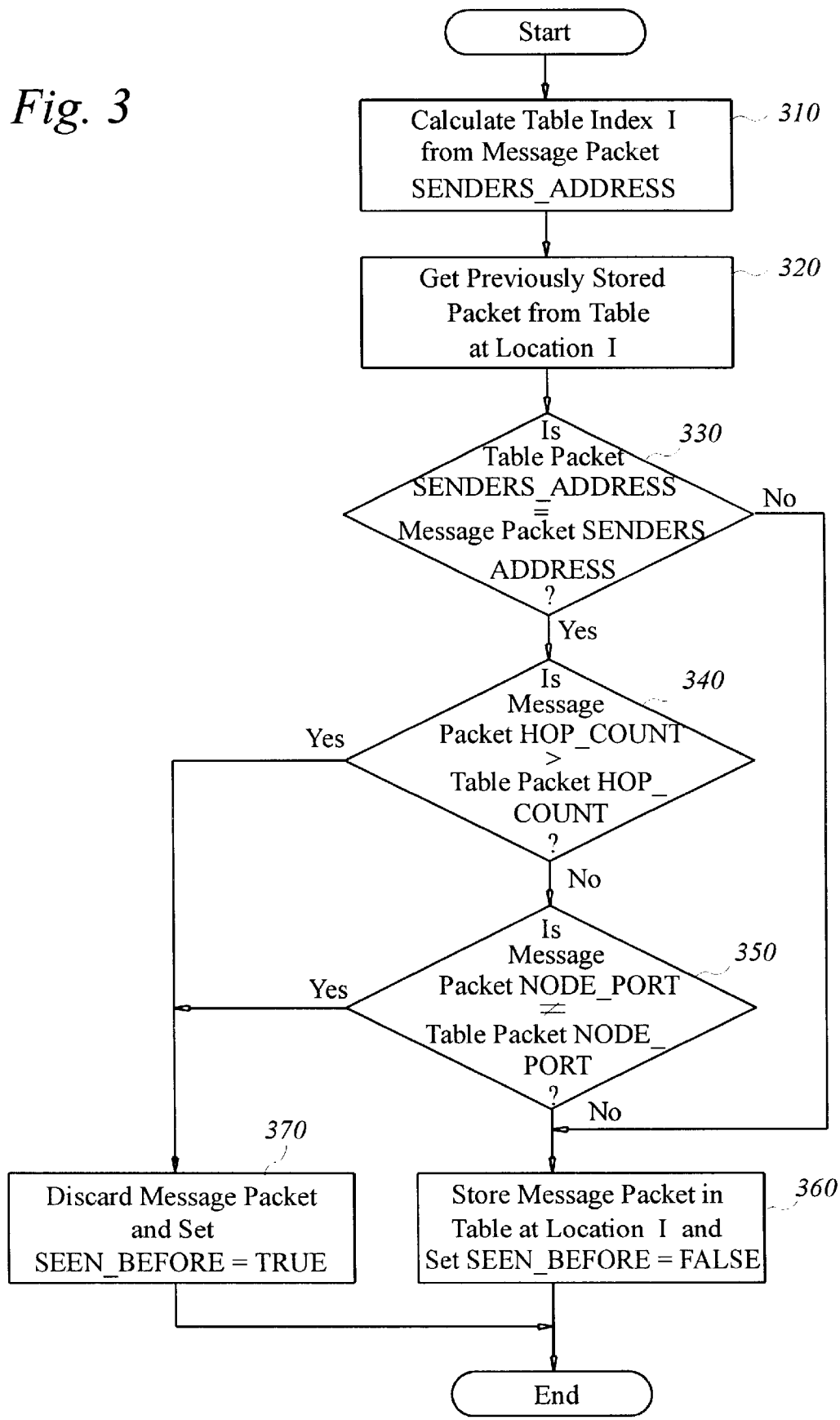
FIG. 3 is a flow diagram illustrating the method in accordance with the present invention for determining whether a particular topology information cell has been previously received by the switch.

Upon receiving a TOPOLOGY_REQUEST message, each switch uses its look-up table to determine whether it has received this particular message before. Shown in FIG. 3 is a flow diagram detailing the method each switch employs to make this determination. The switch begins in block 310 by calculating an index I into the look-up table from the value stored in SENDERS_ADDRESS of the incoming TOPOLOGY_REQUEST packet. As mentioned above, index I is preferably calculated with a suitable hash function, but other indexing methods may also be employed. The switch then fetches the packet stored in the table at the location defined by index I as shown in block 320. In block 330 the SENDERS_ADDRESS of the table packet is compared with the SENDERS_ADDRESS of the incoming message packet. If the two SENDERS_ADDRESSes do not match, then the switch has not seen this particular message packet before. Therefore, the switch will jump to block 360 where it will store the incoming message packet in the look-up table at the location defined by index I. It will also set a flag SEEN_BEFORE to FALSE, indicating that the incoming message packet has not been seen before by this switch.

If the SENDERS_ADDRESSes do match in block 330, then the switch will determine if the incoming message packet's HOP_COUNT is greater than the HOP_COUNT stored in the table packet as shown in block 340. If so, then the switch has seen this message packet before with a shorter hop count, indicating that the message packet is looping. Therefore, the switch will jump to block 370 where it will discard the incoming message packet and set the SEEN_BEFORE flag to TRUE, indicating that the packet has been seen before by this switch.

If the incoming message packet's HOP_COUNT is not greater than the HOP_COUNT in the table packet, then the switch will determine in block 350 if the incoming message packet's NODE_PORT, that is, the port on which the packet was received by the switch, is equal to the table packet's NODE_PORT. If the NODE_PORTs do not match, then it is assumed that there are two routes between the sending switch and the receiving switch. In this case, the switch will move to block 370, discard the incoming message packet, and set the SEEN_BEFORE flag to TRUE.

If the NODE_PORTs do match, then the switch will move to block 360, store the incoming message packet in the table at the location defined by index I, and set the SEEN_BEFORE flag to FALSE.

By referencing the look-up table, as described above, to determine if an incoming TOPOLOGY_REQUEST packet has been seen before, a switch can identify when a packet has been looping and prevent its further propagation through the network. Such a method may be implemented through computer software, an example of which is contained in the Appendix.

In the preferred embodiment of the present invention, each look-up table entry is expired after a specified period of time. This can be accomplished simply by periodically resetting a table entry's SENDERS_ADDRESS to a NULL or other undefined value. Periodically expiring the look-up table entries ensures that each node will have an accurate and current record of the topology of the network and will be able to determine the shortest path to other nodes in the network. Each node is preferably programmed to initiate a topology determination at time intervals substantially shorter than the time at which the look-up table entries are expired. For example, if the switches are programmed to expire table entries every 30 seconds, the switches may also be programmed to initiate a topology determination every 10 seconds. In this manner, every node in the network is continuously advertising its presence to other nodes and simultaneously updating its own topology table.

Figure 4:
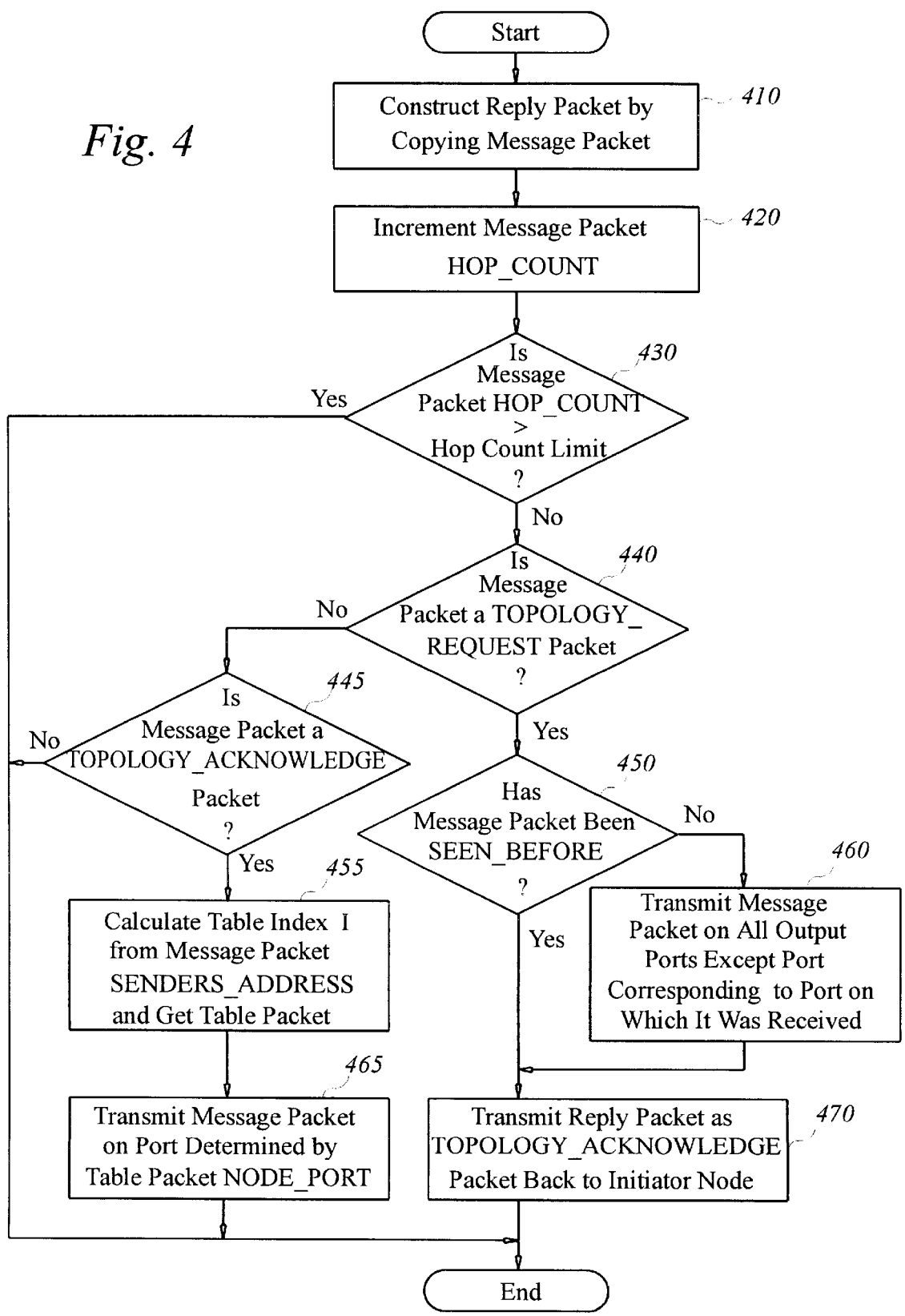
FIG. 4 is a flow diagram illustrating the method in accordance with the present invention for processing an incoming topology information cell.

To further describe the operation of the present invention, it is useful to analyze the operation of the switches when determining how to handle an incoming message. FIG. 4 shows a flow diagram illustrating the following description. In the preferred embodiment, the incoming message packet is initially copied in block 410. This copy will form the basis for constructing a reply message packet as a TOPOLOGY_ACKNOWLEDGE message back to the initiator node. The switch then increments the HOP_COUNT of the incoming message packet in block 420. In block 430, this HOP_COUNT is tested to determine if it is greater than a predefined maximum hop count. If it is, the switch exits the algorithm and discards the packet. This is a fail-safe mechanism which prevents a message packet from propagating through the network indefinitely.

If the HOP_COUNT is under the acceptable limit, the switch then determines in block 440 if the incoming message packet is a TOPOLOGY_REQUEST message. If the received packet is a TOPOLOGY_REQUEST message, the switch then determines in block 450 whether this particular TOPOLOGY_REQUEST message was seen by this switch before, which might occur if the message packet was looping within the network. The process for making this determination is described above and illustrated in the flow diagram of FIG. 3.

If the switch has not seen the packet before, it transmits the TOPOLOGY_REQUEST packet on every output port, except that output port corresponding to the input port upon which the message packet was received as shown in block 460. In doing so, it sets each transmitted packet's SWITCH_ADDRESS to its own node address and each packet's SWITCH_PORT to the port over which the packet is being transmitted. This information, which provides the necessary link data for deducing the entire network topology, will be returned to the initiator node via the TOPOLOGY_ACKNOWLEDGE packet sent by the next downstream node. Via this propagation by every node, the message packet is broadcast throughout the network.

The switch then proceeds to further respond, as shown in block 470, to the TOPOLOGY_REQUEST message by transmitting a TOPOLOGY_ACKNOWLEDGE packet. This packet is constructed by taking the message packet copied in block 410 and setting the TYPE to TOPOLOGY_ACKNOWLEDGE, the HOP_COUNT to zero, the NODE_ADDRESS to the present switch's address, and the NODE_PORT to the port upon which the TOPOLOGY_REQUEST packet was received. The TOPOLOGY_ACKNOWLEDGE packet is sent back to the initiator node by transmitting it on the output port corresponding to the input port on which the TOPOLOGY_REQUEST packet was received. With this information, the initiator node will be able to identify every node in the network, and thus construct an accurate topology.

If it is determined in block 450 that the TOPOLOGY_REQUEST packet was seen before, the switch will discard the packet rather than retransmit it. The switch will jump to block 470 and send a TOPOLOGY_ACKNOWLEDGE packet, however, in the same manner as above. In either case, after a TOPOLOGY_ACKNOWLEDGE packet is constructed and transmitted, the switch exits the algorithm.

If it is determined in block 440 that the incoming message packet is not a TOPOLOGY_REQUEST packet, the switch will determine in block 445 whether the packet is a TOPOLOGY_ACKNOWLEDGE packet which must be transmitted back to the initiator node. If the incoming packet is a TOPOLOGY_ACKNOWLEDGE packet, the switch calculates a table index I from the message packet's SENDERS_ADDRESS and fetches a stored message packet from the look-up table at location I, as shown in block 455. This is the same look-up table as described above and it is indexed in the same fashion. The packet obtained will be the most current TOPOLOGY_REQUEST packet received by the switch from the initiator node corresponding to the TOPOLOGY_ACKNOWLEDGE packet. In block 465, the switch will retransmit the TOPOLOGY_ACKNOWLEDGE packet on the output port corresponding to the input port on which that last TOPOLOGY_REQUEST packet was received. In this fashion, the TOPOLOGY_ACKNOWLEDGE message is propagated back to the initiator node.

If it is determined in block 445 that the incoming message packet is not a TOPOLOGY_ACKNOWLEDGE packet or does not correspond to a previously received TOPOLOGY_REQUEST packet, then an error has occurred. The packet is discarded and the switch will exit the algorithm.

For each topology request sequence, the initiator node will receive at least one TOPOLOGY_ACKNOWLEDGE message from every other node in the network. As shown in Table 1, each of these messages will contain the address of the replying node, the port upon which the TOPOLOGY_REQUEST message was received, the address of the node which immediately transmitted the TOPOLOGY_REQUEST message to the replying node, and the port upon which that node sent the TOPOLOGY_REQUEST message to the replying node. In other words, each TOPOLOGY_ACKNOWLEDGE message will define a link between two nodes in the network. It will be recognized that with TOPOLOGY_ACKNOWLEDGE messages from every node in the network, the complete network topology may be deduced. In such a manner, the switches comprising the network can at all times determine the topology of the network while eliminating the possibility of infinitely looping topology information packets. Such determination ensures that normal data cells can travel on the shortest path virtual circuits.

It should be understood that various other modifications will also be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

APPENDIX

For the sake of clarity and example, one method for implementing the logic employed by the switches to determine if a TOPOLOGY_REQUEST packet is contained in a loop is described below. The logic corresponds to the methodology displayed in FIG. 3.

```
BOOLEAN seen_before(topology_packet packet)
    {   /* calculate an index I from the address of the sender packet */
        I = calculate_index(packet.senders_address);
        if (table[I].senders_address == packet.senders_address
                && (packet.hop_count > table[I].hop_court ||
                packet.receive_port != table[I].receive_port))
        {   /* discard incoming packet */
            return TRUE;
        }
        else
        {   /* store incoming packet information into table */
            table[I] = packet;
            return FALSE;
        }
    }
```

Below is an example of a method for implementing the logic employed by the switches to determine how to respond to an incoming packet. The logic corresponds to the methodology displayed in FIG. 4.

```
handle_topology_message(packet_type packet, int receive_port)
{
    packet_type reply_packet = packet;
    packet.hop_count = packet.hop_count + 1;
    if (packet.hop_count > limit)
            return;
    if (packet.type == TOPOLOGY_REQUEST)
    {
            if (NOT seen_before(packet))
            {   /* propagate the request to every port */
                for (port = every port in turn)
                {
                    if (port != node_port)
                    {
                        packet.switch_address = my_address;
                        packet.switch_port = port;
                        transmit_packet(port, packet);
                    }
                }
            }
            {
                reply_packet.type = TOPOLOGY_ACKNOWLEDGE
                reply_packet.hop_count = 0;
                reply_packet.node_address = my_address;
                reply_packet.node_port = node_port;
                transmit_packet(node_port, reply_packet);
            }
    }
    if (packet.type == TOPOLOGY_ACKNOWLEDGE)
    {   /* calculate an index I from the address of the sender of the packet; */
        I = calculate_index(packet.address);
        if (table[I].address == packet.address)
        {
            transmit_packet(table[I].port, packet);
        }
    }
}
```

What is claimed is:

1. A method for determining the topology of a network comprising the steps of:
   (a) a first node transmitting a packet upon one or more output ports;
   (b) at least one second node receiving said packet on an input port;
   (c) said second node comparing said packet with a table stored in memory in said second node and thereafter setting a variable indicating whether said packet had been seen before;
   (d) conditional upon step (c) if said packet is a packet of a first type and has not been seen before, said second node transmitting said packet upon all output ports other than the output port corresponding to the input port upon which said packet was received and returning a packet of a second type to said first node;

(e) conditional upon step (c) if said packet is a packet of the first type and has been seen before, said second node transmits a packet of the second type to said first node;

(f) conditional upon step (c) if said packet is a packet of the second type, said second node transmits said packet upon the output indicated in said table.

2. A method as recited in claim 1 wherein said first type packet and said second type packet comprise:

a packet type field;

a hop count field; and a field indicating the source of said packet.

3. A method as recited in claim 2 wherein said packet type field of said first type packet indicates a request and said packet type field of said second type packet indicates an acknowledge.

4. A method as recited in claim 3 wherein said step (b) of said second node receiving said packet further comprises the steps of:

incrementing said hop count field;

comparing said hop count field with a predetermined maximum; and discarding said packet if said hop count field is greater than said predetermined limit.

5. A method as recited in claim 4 wherein said step (c) of comparing said request packet with a table stored in memory comprises a table which includes for each previously received packet, a source entry, a hop count entry, and a receive-port entry.

6. A method as recited in claim 5 wherein said table stored in memory is updated by a method comprising:

(a) comparing said source field of said request packet with said source entries in said table;

(b) conditional upon step (a) if said source field is not equivalent to one of said source entries, said second node performs the step of storing in said table said source field of said request packet as the source entry, hop count field of said request packet as the hop-count entry, the receive-port of said request packet as the receive-port entry, and setting a variable indicating that said request packet has not previously been received;

(c) conditional upon step (a) if said source field is equivalent to one of said source entries, said second node performs the steps of:

(i) comparing the hop count field of said request packet with the hop count entry of said table, 1) conditional upon step (c)(i) if said hop count field of said request packet is greater than said hop count entry, said second node sets a variable indicating that said request packet had previously been received;

2) conditional upon step (c)(i) if said hop count field of said request packet is not greater than said hop-count entry, said second node performs steps comprising:

a) comparing said receive-port field of said request packet with said receive-port entry, i) conditional upon step a) if said receive port field of said request packet is equivalent to said receive-port entry, said second node stores in said table said source field of said request packet as the source entry, said hop count field of said request packet as the hop-count entry, said receive-port of said request packet as the receive-port entry, and sets a variable indicating that said request packet has not previously been received;

ii) conditional upon step a) if said receive port field of said request packet is not equivalent to said receive-port entry, said second node sets a variable indicating that said request packet has previously been received.

7. A method as recited in claim 6 further comprising the steps of:

said second node updating said table after a first predetermined time interval; and said second node discarding said table after a second predetermined time interval wherein said second predetermined time interval is at least twice as long as said first predetermined time interval.

8. A method as recited in claim 7 wherein said request packets and acknowledge packets further comprise an identifier field which uniquely identifies each iteration of said method.

9. A method for determining the topology of a network consecutively comprising the steps of:

(a) a first node transmitting a packet upon all its outputs, said packet comprising a packet type field indicating that said packet is a request packet, a hop count field, and a field indicating the source of said packet;

(b) a second node receiving said packet;

(c) said second node determining said packet type of said packet;

(d) conditional upon step (c) if said packet type is a request packet, said switch performs steps comprising:

(i) comparing said request packet with a table stored in memory;

(ii) conditional upon step (d)(i) if a variable indicates that said request packet has previously been received, said switch transmits an acknowledge packet to said first node;

(iii) conditional upon step (d)(i) if the variable indicates that said request packet has not previously been received, said switch performs the steps comprising:

1) broadcasting said request packet, and 2) transmitting an acknowledge packet to said first node;

(e) conditional upon step (c) if said packet type is an acknowledge packet, said switch performs the steps comprising:

(i) comparing said acknowledge packet with a table stored in memory; and (ii) transmitting said acknowledge packet upon the output indicated in said table.

10. A method as recited in claim 9 wherein said step (c) of determining the packet type further comprises the steps of:

incrementing said hop count field;

comparing said hop count field with a predetermined maximum; and discarding said packet if said hop count field is greater than said predetermined limit.

11. A method as recited in claim 10 wherein said step (d)(i) of comparing said request packet with a table stored in memory comprises a table which includes for each previously received packet, a source entry, a hop count entry, and a receive-port entry.

12. A method as recited in claim 11 wherein said table stored in memory is updated by a method comprising:

(a) comparing said source field of said request packet with said source entries in said table;

(b) conditional upon step (a) if said source field is not equivalent to one of said source entries, said second node performs the step of storing in said table said source field of said request packet as the source entry, hop count field of said request packet as the hop-count entry, the receive-port of said request packet as the receive-port entry, and setting a variable indicating that said request packet has not previously been received;

(c) conditional upon step (a) if said source field is equivalent to one of said source entries, said second node performs the steps of:

(i) comparing the hop count field of said request packet with the hop count entry of said table, 1) conditional upon step (c)(i) if said hop count field of said request packet is greater than said hop count entry, said second node sets a value indicating that said request packet had previously been received;

2) conditional upon step (c)(i) if said hop count field of said request packet is not greater than said hop-count entry, said second node performs steps comprising:

a) comparing said receive-port field of said request packet with said receive-port entry, i) conditional upon step a) if said receive port field of said request packet is equivalent to said receive-port entry, said second node stores in said table said source field of said request packet as the source entry, said hop count field of said request packet as the hop-count entry, said receive-port of said request packet as the receive-port entry, and sets a value indicating that said request packet has not previously been received;

ii) conditional upon step a) if said receive port field of said request packet is not equivalent to said receive-port entry, said second node sets a variable indicating that said request packet has previously been received.

13. A method as recited in claim 12 further comprising the steps of:

said switch updating said table after a first predetermined time interval; and said switch discarding said table after a second predetermined time interval wherein said second predetermined time interval is at least twice as long as said first predetermined time interval.

14. A method as recited in claim 13 wherein said packet further comprises an identifier field which uniquely identifies each iteration of said method.

* * * * *